US008149709B2

(12) United States Patent
Srinivasan et al.

(10) Patent No.: US 8,149,709 B2
(45) Date of Patent: Apr. 3, 2012

(54) SERIALIZATION QUEUE FRAMEWORK FOR TRANSMITTING PACKETS

(75) Inventors: Thirumalai Srinivasan, Menlo Park, CA (US); Sunay Tripathi, San Jose, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 482 days.

(21) Appl. No.: 11/479,143

(22) Filed: Jun. 30, 2006

(65) Prior Publication Data

US 2008/0002730 A1 Jan. 3, 2008

(51) Int. Cl.
*G01R 31/08* (2006.01)
*H04L 12/28* (2006.01)
(52) U.S. Cl. .................................... 370/235; 370/412
(58) Field of Classification Search .............. 370/412
See application file for complete search history.

(56) References Cited

U.S. PATENT DOCUMENTS

| 5,710,908 | A  | * | 1/1998 | Man ............................ 709/230 |
| 5,802,310 | A  | * | 9/1998 | Rajaraman ................... 709/234 |
| 7,746,783 | B1 | * | 6/2010 | Tripathi et al. .............. 370/235 |
| 2003/0172171 | A1 | * | 9/2003 | Ueno ........................... 709/230 |
| 2004/0228273 | A1 | * | 11/2004 | Kurobe et al. ................ 370/229 |
| 2005/0086390 | A1 | * | 4/2005 | Banerjee et al. .............. 709/250 |
| 2005/0177657 | A1 | * | 8/2005 | Pope et al. ....................... 710/36 |
| 2006/0031568 | A1 | * | 2/2006 | Eydelman et al. ........... 709/235 |
| 2006/0031588 | A1 | * | 2/2006 | Sen et al. ...................... 709/248 |
| 2006/0179121 | A1 | * | 8/2006 | Kegoya et al. ............... 709/217 |
| 2006/0179279 | A1 | * | 8/2006 | Jones et al. ................... 712/214 |
| 2006/0187836 | A1 | * | 8/2006 | Frey et al. ..................... 370/235 |
| 2006/0234716 | A1 | * | 10/2006 | Vesterinen et al. ........... 455/450 |
| 2007/0162619 | A1 | * | 7/2007 | Aloni et al. ................... 709/250 |

OTHER PUBLICATIONS

"Solaris Networking—The Magic Revealed (Part I)"; Sunay Tripathi's Solaris Networking Weblog; Nov. 14, 2005, pp. 1-22 (22 pages).

* cited by examiner

*Primary Examiner* — John Blanton
(74) *Attorney, Agent, or Firm* — Osha • Liang LLP

(57) ABSTRACT

A method for sending packets. The method includes determining with which of a plurality of virtual serialization queues (VSQs) a first packet is associated, wherein a first application is attempting to issue the first packet, if a first VSQ of the plurality of VSQs has not exceeded a first bandwidth allocation, wherein the first VSQ is associated with the first packet and is associated with the first bandwidth allocation, then sending the first packet to the first VSQ, processing the first packet by a first virtual network stack (VNS) to obtain a first processed packet, wherein the first VSQ is associated with the first VNS, and sending the first processed packet to a physical network interface card (NIC) operatively connected to the first VNS. Alternatively, if the first VSQ has exceeded the first bandwidth allocation, then blocking the first application from issuing the first packet.

20 Claims, 4 Drawing Sheets

SERIALIZATION QUEUE FRAMEWORK FOR TRANSMITTING PACKETS

CROSS REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. Pat. No. 7,471,689; "Method and Apparatus for Consolidating Available Computing Resources on Different Computing Devices" with U.S. Pat. No. 7,782,870; "Assigning Higher Priority to Transactions Based on Subscription Level" with U.S. Pat. No. 7,591,011; "Method and Apparatus for Dynamically Isolating Affected Services Under Denial of Service Attack" with U.S. Pat. No. 7,739,736; "Method and Apparatus for Improving User Experience for Legitimate Traffic of a Service Impacted by Denial of Service Attack" with U.S. Pat. No. 7,621,899; "Method and Apparatus for Limiting Denial of Service Attack by Limiting Traffic for Hosts" with U.S. Pat. No. 7,640,591; "Hardware-Based Network Interface Per-Ring Resource Accounting" with U.S. Pat. No. 7,623,538; "Dynamic Hardware Classification Engine Updating for a Network Interface" with U.S. Pat. No. 7,593,404; "Network Interface Card Resource Mapping to Virtual Network Interface Cards" with U.S. Pat. No. 7,733,890; "Network Interface Decryption and Classification Technique" with U.S. Pat. No. 7,607,168; "Method and Apparatus for Enforcing Resource Utilization of a Container" with U.S. Pat. No. 7,697,434; "Method and Apparatus for Enforcing Packet Destination Specific Priority Using Threads" with U.S. Pat. No. 7,499,457; "Method and Apparatus for Processing Network Traffic Associated with Specific Protocols" with U.S. Pat. No. 7,675,920.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. Pat. No. 7,760,722; and "Method and Apparatus for Monitoring Packets at High Data Rates" with U.S. Pat. No. 7,746,783.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. Pat. No. 7,672,299; "Method and System for Controlling Virtual Machine Bandwidth" with U.S. Pat. No. 7,613,132; "Virtual Switch" with U.S. Pat. No. 7,643,482; "System and Method for Virtual Network Interface Cards Based on Internet Protocol Addresses" with U.S. Pat. No. 7,684,423; "Virtual Network Interface Card Loopback Fastpath" with U.S. Pat. No. 7,630,368; "Bridging Network Components" with U.S. Pat. No. 7,634,608; "Reflecting the Bandwidth Assigned to a Virtual Network Interface Card Through Its Link Speed" with U.S. Pat. No. 7,792,140; "Method and Apparatus for Containing a Denial of Service Attack Using Hardware Resources on a Virtual Network Interface Card" with U.S. Pat. No. 7,966,401; "Virtual Network Interface Cards with VLAN Functionality" with U.S. Pat. No. 7,742,474; "Method and Apparatus for Dynamic Assignment of Network Interface Card Resources" with U.S. Pat. No. 7,613,198; and "Generalized Serialization Queue Framework for Protocol Processing" with U.S. Pat. No. 7,715,416.

BACKGROUND

Network traffic is transmitted from a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for sending packets, including determining with which of a plurality of virtual serialization queues (VSQs) a first packet is associated, wherein a first application is attempting to issue the first packet, if a first VSQ of the plurality of VSQs has not exceeded a first bandwidth allocation, wherein the first VSQ is associated with the first packet and is associated with the first bandwidth allocation, then perform sending the first packet to the first VSQ, processing the first packet by a first virtual network stack (VNS) to obtain a first processed packet, wherein the first VSQ is associated with the first VNS, and sending the first processed packet to a physical network interface card (NIC) operatively connected to the first VNS, if the first VSQ has exceeded the first bandwidth allocation, then perform, blocking the first application from issuing the first packet.

In general, in one aspect, the invention relates to a system, including a first application configured to attempt issuing a first packet, a plurality of virtual serialization queues (VSQs), a first virtual network stack (VNS), and a physical network interface card (NIC), wherein the system is configured to: determine with which of the plurality of VSQs the first packet is associated, after the first application has attempted issuing the first packet, if a first VSQ of the plurality of VSQs has not exceeded a first bandwidth allocation, wherein the first VSQ is associated with the first packet and is associated with the first bandwidth allocation, then perform, enabling the first application to issue the first packet to the first VSQ, processing the first packet by the first VNS to obtain a first processed packet, wherein the first VSQ is associated with the first VNS, and sending the first processed packet to the NIC, wherein the physical NIC is operatively connected to the first VNS, if the first VSQ has exceeded the first bandwidth allocation, then perform blocking the first application from issuing the first packet.

In general, in one aspect, the invention relates to a computer readable medium comprising executable instructions for performing a method for sending packets, the method including determining with which of a plurality of virtual serialization queues (VSQs) the first packet is associated, wherein a first application is attempting to issue the first packet, if a first VSQ of the plurality of VSQs has not exceeded a first bandwidth allocation, wherein the first VSQ is associated with the first packet and is associated with the first bandwidth allocation, then perform sending the first packet to the first VSQ, processing the first packet by a first virtual network stack (VNS) to obtain a first processed packet, wherein the first VSQ is associated with the first VNS, and sending the first processed packet to a physical network interface card (NIC) operatively connected to the first VNS, and if the first VSQ has exceeded the first bandwidth allocation, then perform blocking the first application from issuing the first packet.

Other aspects of the invention will be apparent from the following description and the appended claims.

DETAILED DESCRIPTION

Figure 1:
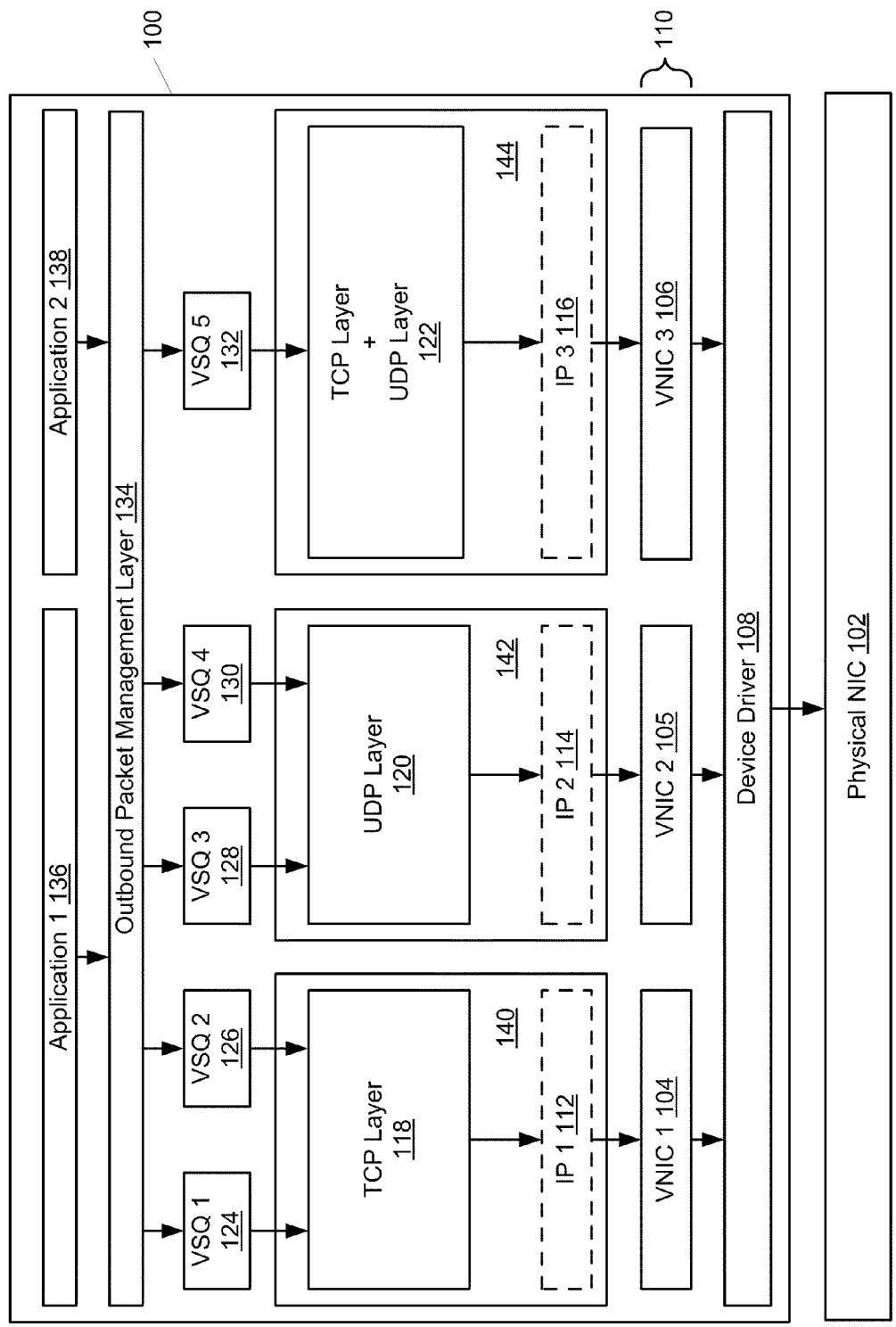
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a serialization queue framework for processing outbound packets. More specifically, embodiments of the invention relate to method and system for transmitting packets from a process executing on a host to the network.

FIG. 1 shows a system in accordance with one embodiment of the invention. The system shown in FIG. 1 includes a host (100) and a physical network interface card (NIC) (102). Each of the aforementioned components is described below.

In one embodiment of the invention, the NIC (102) is configured to receive packets from the host (100), process the receive packets as required, and then send the packets to the network (not shown) (e.g., a Local Area Network (LAN), a Wide Area Network (WAN)).

In one embodiment of the invention, the host (100) includes a number of applications (e.g., Application 1 (136), Application 2 (138)), an outbound packet management layer (134), a number of virtual network serialization queues (VSQs) (e.g., VSQ 1 (124), VSQ 2 (126), VSQ 3 (128), VSQ 4 (130), VSQ 5 (132)), a number of virtual network stacks (VNSs) (e.g., 140, 142, 144), a number of virtual network interface cards (VNICs) (e.g., VNIC 1 (104), VNIC 2 (105), VNIC 2 (106)), and a device driver (108). Each of the aforementioned components is described in detail below.

In one embodiment of the invention, each application (e.g., Application 1 (136), Application 2 (138)) corresponds to a process executing on the host (100), where the process includes functionality to issue packets.

In one embodiment of the invention, the outbound packet management layer (134) is a process (or a number of related processes) executing on the host (100) and is configured to monitor the number of packets each of the applications (e.g., Application 1 (136), Application 2 (138)) is issuing and generate monitoring information based on the aforementioned monitoring. As shown in FIG. 1, each application (e.g., Application 1 (136), Application 2 (138)) may be associated with one or more VSQs (e.g., VSQ 1 (124), VSQ 2 (126), VSQ 3 (128), VSQ 4 (130), VSQ 5 (132)).

In one embodiment of the invention, the outbound packet management layer (134) is also configured to determine to which of the number VSQs (e.g., VSQ 1 (124), VSQ 2 (126), VSQ 3 (128), VSQ 4 (130), VSQ 5 (132)) to send each of the issued packets (see FIGS. 2 and 3, below).

In one embodiment of the invention, each VSQ (e.g., VSQ 1 (124), VSQ 2 (126), VSQ 3 (128), VSQ 4 (130), VSQ 5 (132)) corresponds to a queue data structure and is configured to queue packets prior to processing of the packets by the associated transport layer (e.g., TCP Layer (118), UDP Layer (120), etc.). Further, each VSQ (e.g., VSQ 1 (124), VSQ 2 (126), VSQ 3 (128), VSQ 4 (130), VSQ 5 (132)) is associated with a VNS (140, 142, 144) and is configured to process packets in accordance with configuration parameters associated with the specific VSQ.

For example, if the VSQ is associated with a VNS (e.g., 140) that includes a protocol specific transport layer corresponding to a Transmission Control Protocol (TCP) layer (e.g., TCP Layer (118), then the configuration parameter may specify that each thread accessing the VSQ must implement a mutual exclusion policy. Said another way, the VSQ may be configured to only allow one thread to access the VSQ at a time. This functionality may be achieved by associating the VSQ with a single lock and only allowing a thread to access the VSQ if the thread has acquired the lock.

Alternatively, if the VSQ (e.g., 142) is located in a VNS that includes a protocol specific transport layer corresponding to a User Datagram Protocol (UDP) layer (e.g., UDP Layer (120), then the configuration parameter may specify that multiple threads may concurrently access the VSQ, thereby allowing for concurrent processing of packets.

In one embodiment of the invention, the configuration parameters associated with a given VSQ are consistent with the packet processing requirements imposed by the transport layer protocol (e.g., TCP, UDP, etc.). Further, if the VSQ includes a generic transport layer (e.g., 122), then the configuration parameters for the VSQ are set to conform to the packet processing requirements of the more stringent transport level protocol. For example, if the generic transport layer is configured to process both TCP and UDP packets, then the configuration parameters associated with the corresponding VSQ are set to conform to the packet processing requirements of TCP.

In one embodiment of the invention, each VSQ (e.g., VSQ 1 (124), VSQ 2 (126), VSQ 3 (128), VSQ 4 (130), VSQ 5 (132)) is associated with a bandwidth allocation. In one embodiment of the invention, the bandwidth allocation specifies the number of packets the VSQ application can receive in a given period of time. In one or more embodiments of the invention, the bandwidth allocation is specified as a number of packets per second. For example, the bandwidth allocation for a VSQ may be ten packets per second.

As discussed above, each VSQ (e.g., VSQ 1 (124), VSQ 2 (126), VSQ 3 (128), VSQ 4 (130), VSQ 5 (132)) is bound to a VNS (140, 142, 144). In one embodiment of the invention, each VNS (140, 142, 144) includes an Internet Protocol (IP) Layer (i.e., IP 1 (112), IP 2 (114), IP 3 (116)) and a protocol specific transport layer (e.g., TCP Layer (118), UDP Layer (120)) or a generic transport layer (e.g., TCP Layer+UDP Layer (122)).

In one embodiment of the invention, the TCP layer (118) includes functionality to process packets in accordance with TCP, the UDP layer (120) includes functionality to process packets in accordance with UDP, and the generic transport layer (122) includes functionality to process in accordance with either TCP or UDP.

In one embodiment of the invention, the IP layer (e.g., IP 1 (112), IP 2 (114), IP 3 (116)) is configured to perform IP level processing of packets received from the transport layer (e.g., 118, 120, 122). In one embodiment of the invention, the transport layer (e.g., 118, 120, 122) may include functionality to perform IP layer processing, in which case the IP Layer may be bypassed (i.e., the IP layer does not need to perform any IP layer processing prior to sending the packet to the associated VNIC).

In one embodiment of the invention, a VNIC corresponds to a software component in the Media Access Control (MAC) layer (110) in the host (100). Each VNIC (i.e., VNIC 1 (104), VNIC 2 (105), VNIC 3 (106)) includes the functionality of a physical NIC. In one embodiment of the invention, each VNIC is associated with at least one MAC address and at least one Internet Protocol (IP) address.

Further, to all components conceptually above the VNIC (i.e., the Virtual Network Stacks (VNSs) (140, 142, and 144) and the Applications (136, 138)), the VNICs appear as physical NICs. Thus, to Applications (136, 138) in the host (100), there are three physical NICs, namely, VNIC 1 (104), VNIC 2 (105), and VNIC 3 (106). In one embodiment of the invention, all components conceptually above the VNICs are not aware that the VNICs are connected to the physical NIC (102). In one embodiment of the invention, each VNS (140, 142, 144) is bound to one of the VNICs (104, 105, 106).

In one or more embodiments of the invention, each VNIC (104, 105, 106) interfaces with the device driver (108). The device driver (108) includes functionality to receive packets from the VNICs (104, 105, 106) and send the packets to the physical NIC (102). Once the packets are placed in the physical NIC (102), typically in a transmit ring (not shown), the physical NIC (102) performs the necessary steps to send the packet towards its destination on the network (not shown).

Figure 2:
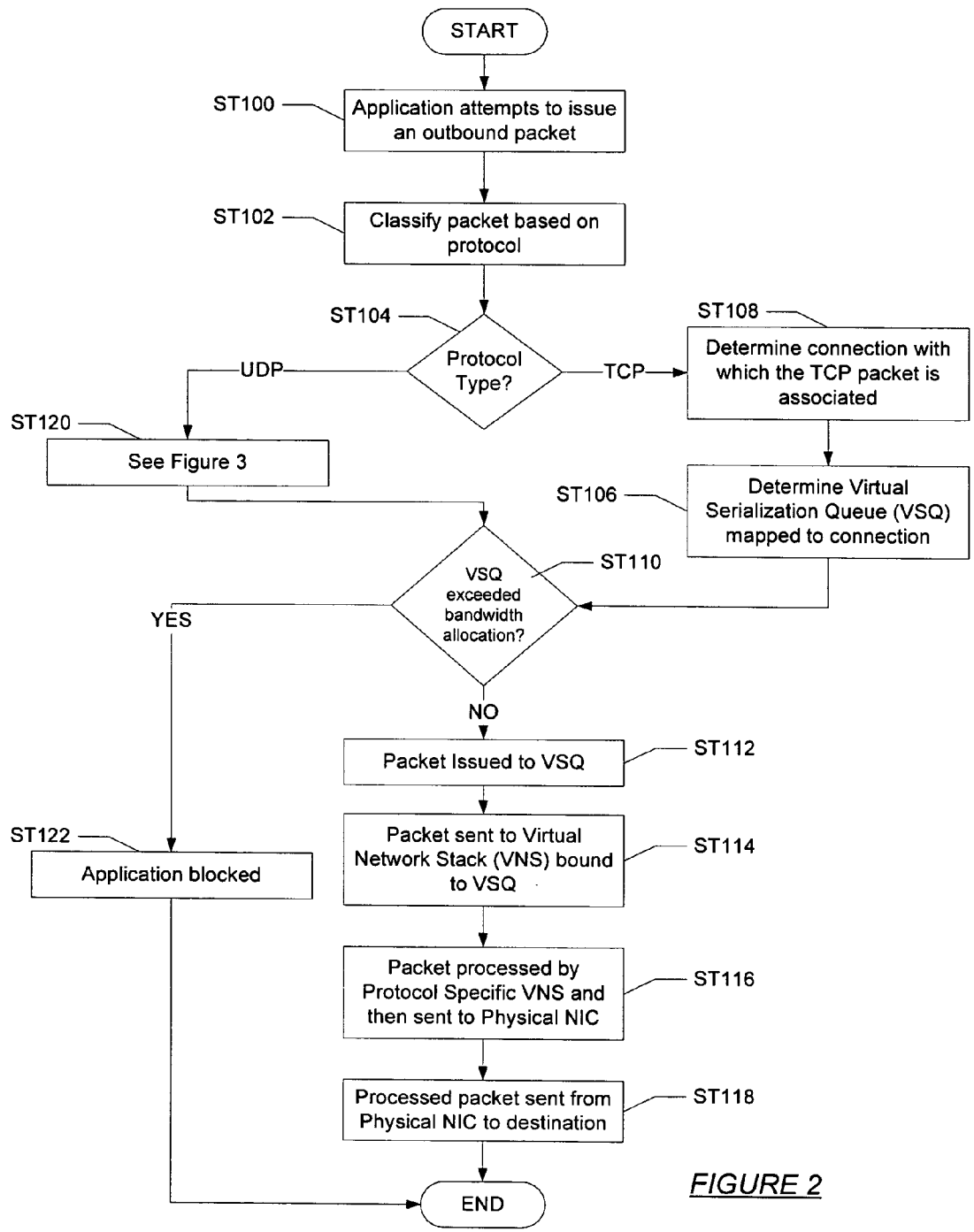
FIGS. 2-3 show flow charts in accordance with one or more embodiments of the invention.

FIG. 2 shows a flow chart in accordance with one or more embodiments of the invention. More specifically, FIG. 2 shows a method for issuing a packet in accordance with one or more embodiments of the invention. Initially, an application attempts to issue an outbound packet (ST100). The packet is then classified based on the transport protocol (e.g., TCP, UDP, etc.) with which the packet is associated (ST102). In one embodiment of the invention, ST102 may be implicitly performed based on the context in which the packet is issued. For example, if the packet is issued in the context of a connection then the packet is a TCP packet. Alternatively, if the packet is not associated with a connection, the system may default to treating the packet as a UDP packet.

Continuing with the discussion of FIG. 2, if the packet is a UDP packet (ST104), then the method proceeds to ST120. ST120 is described in FIG. 3 below. Once the steps in FIG. 3 have been performed, the process proceeds to ST110.

If the packet is a TCP packet (ST104), then the method proceeds to ST108.

With respect to ST108, at ST108 a determination is made about what connection is associated with the packet. Once the connection is determined, the VSQ mapped to the connection is obtained (ST106). In one embodiment of the invention, in accordance with TCP, a connection is initially established between the application issuing the packet and a network host (or application executing thereon) prior to sending any TCP packets associated with the connection. In one embodiment of the invention, once the connection has been established the connection is associated with a VSQ. The connection may be associated with a pre-existing VSQ or a new VSQ may be created. Further, each VSQ may be associated with one or more connections.

Once ST120 or ST106 are completed, a determination is made whether the VSQ (i.e., the VSQ identified in ST120 or ST106) has exceeded its bandwidth allocation (ST110). If the VSQ has exceed its bandwidth allocation, then the application attempting issue is blocked (i.e., unable to attempt to issue additional packets) until the VSQ sends a notification to the application indicating that the application is no longer blocked (ST122).

In one embodiment of the invention, when it is determined that the VSQ has exceeded its bandwidth allocation, the VSQ is blocked for all applications attempting to issue packets to the VSQ.

If the VSQ has not exceeded its bandwidth allocation, then the application proceeds to issue the packet to the VSQ (ST112). The packet is subsequently sent from to the VNS bound to the VSQ (ST114). In one embodiment of the invention, the packet is sent to the VNS from the VSQ based on the configuration parameters associated with the VSQ. The packet is subsequently processed by the VNS or, more specifically, the transport layer (and optionally the IP layer) in the VNS and the resulting processed packet is then sent to the physical NIC (ST116). In one embodiment of the invention, sending the processed packet to the physical NIC includes sending the processed packet to the VNIC bound to the VNS and then, via the device driver, sending the processed packet to the physical NIC. Once the processed packet has been received by the physical NIC, the physical NIC sends the processed packet towards its destination on the network (ST118).

Figure 3:
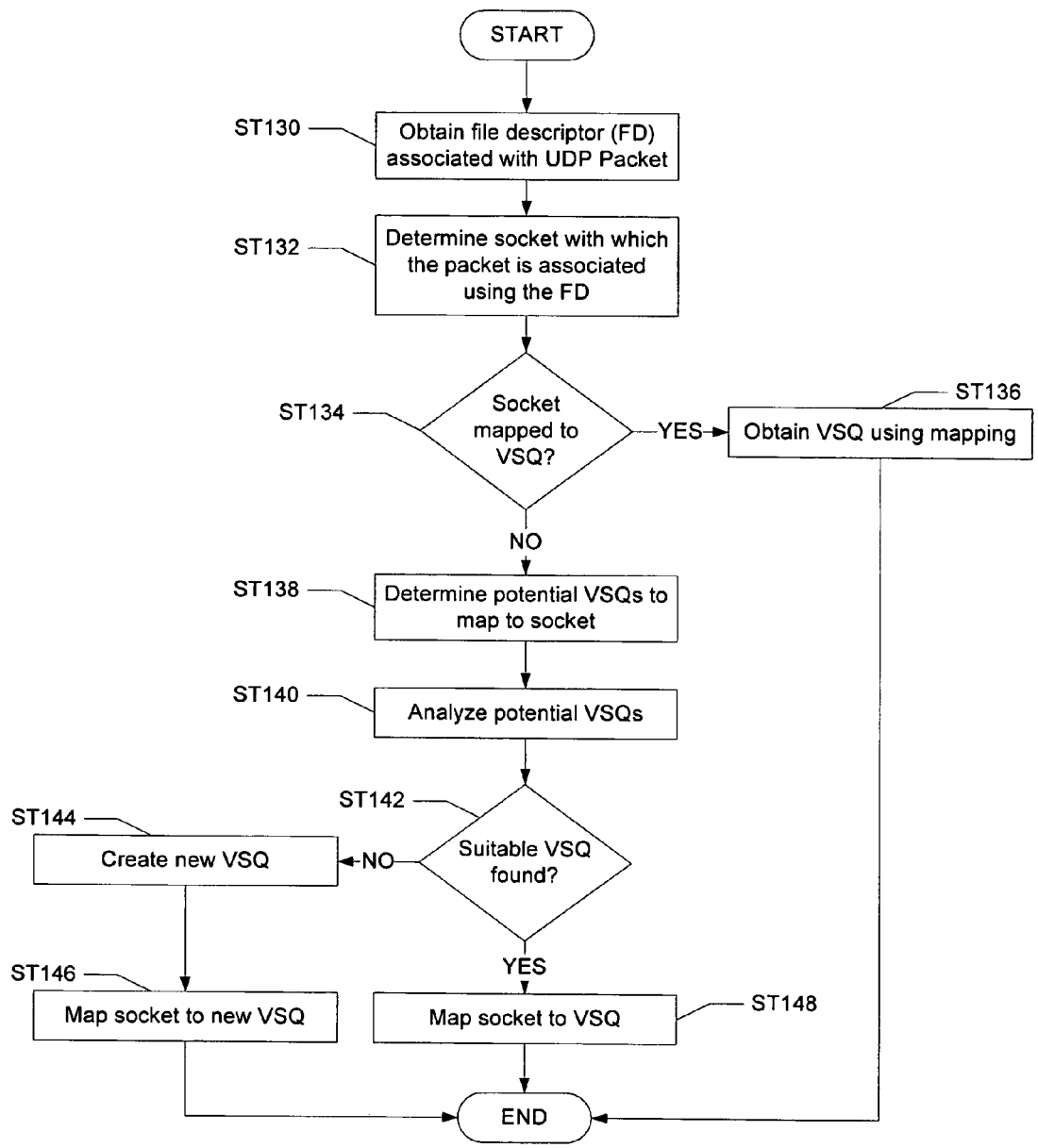

FIG. 3 shows a flow chart in accordance with one or more embodiments of the invention. More specifically, FIG. 3 describes ST120 in FIG. 2.

As discussed above, once the packet is identified as a UDP packet, the field descriptor (FD) associated with the packet is obtained (ST130). The FD is then used to determine the socket with which the packet is associated with using the FD (ST132). A determination is then made whether the socket is mapped to a VSQ (ST134). If the socket is mapped to a VSQ, then the VSQ is obtained using the mapping and the socket (ST136).

Alternatively, if the socket is not mapped to a VSQ, then the host is queried to determine the potential VSQs available for mapping to the socket (ST138). In one embodiment of the invention, potential VSQs may correspond to all VSQs in the host, all VSQs currently processing UDP packets, or any other subset of VSQs. The potential VSQs are then analyzed to determine whether a suitable VSQ is available in the host (ST140). In one embodiment of the invention, a VSQ is deemed suitable if the VSQ is configured to support UDP and is not currently highly utilized by existing sockets. Alternatively, a VSQ is deemed suitable if the VSQ is configured to support UDP and less than a threshold number of sockets currently map to the VSQ. In one embodiment of the invention, once a socket is closed, the socket is removed from the mapping.

Continuing with the discussion of FIG. 3, if a suitable socket is found, then the socket is mapped to the suitable VSQ (as determined in ST140-ST142) and the process ends. Alternatively, if no suitable VSQ is found, then a new VSQ is created (and associated with configuration parameters consistent with the processing of UDP packets) (ST144). The socket is then mapped to the new VSQ (ST146). The process then ends. As discussed in above, once the process in FIG. 3 ends, ST120 in FIG. 2 is complete and the process proceeds to ST114 in FIG. 2.

Figure 4:
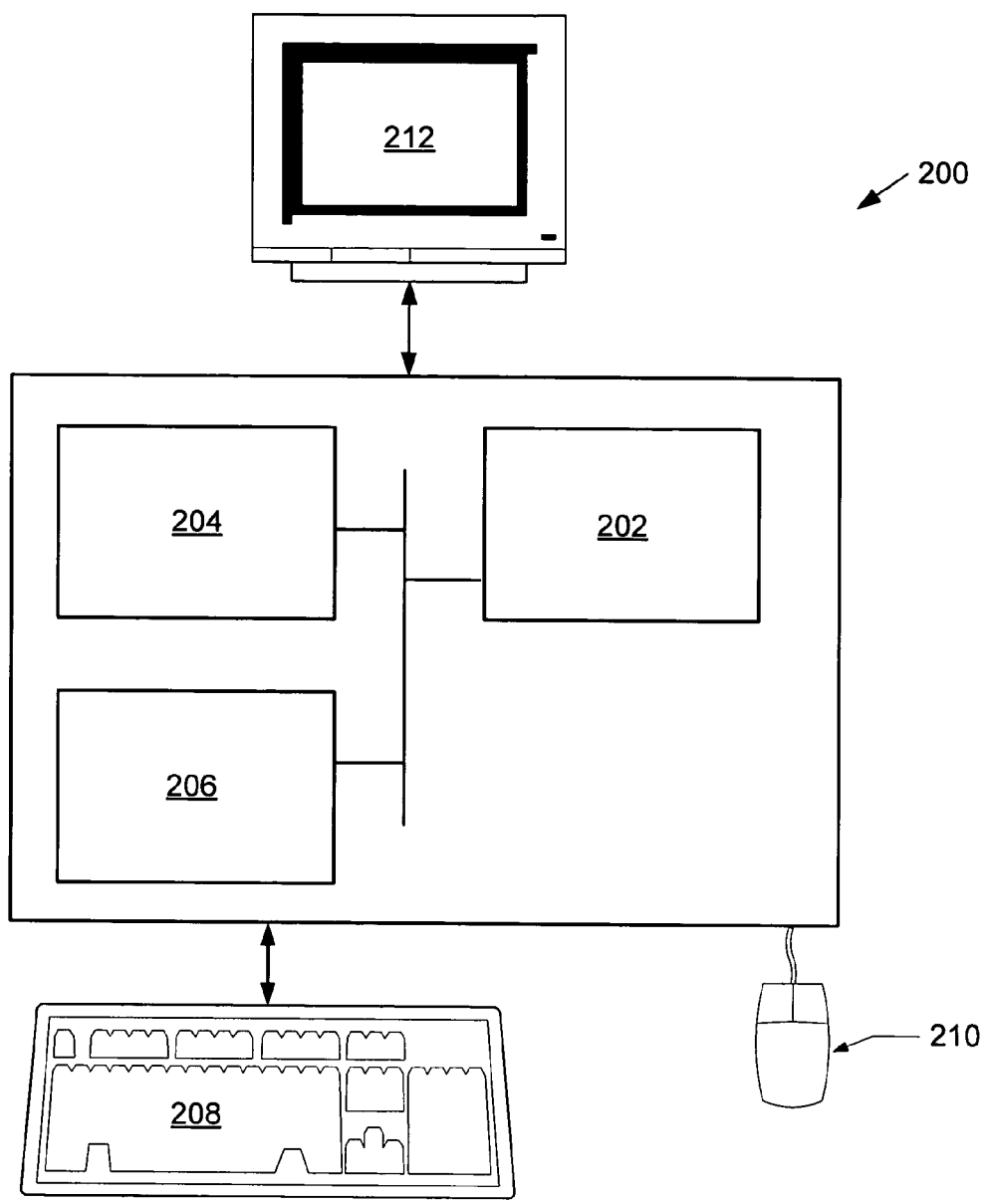
FIG. 4 shows a computer system in accordance with one embodiment of the invention.

An embodiment of the invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sending packets, comprising:
determining, based on a transport protocol associated with a first packet, a first virtual serialization queue (VSQ) of a plurality of virtual serialization queues (VSQs) with which the first packet is associated, wherein a first application is attempting to issue the first packet, wherein the plurality of VSQs are located in a single execution environment;
if the first VSQ has not exceeded a first bandwidth allocation associated with the first VSQ, then perform:
sending the first packet from the first application to the first VSQ;
queuing the first packet by the first VSQ;
sending the first packet from the first VSQ to a first virtual network stack (VNS) of a plurality of virtual network stacks (VNSs), wherein the first VNS is associated with the first VSQ, wherein the first VNS includes a transport layer corresponding to the transport protocol associated with the first packet, wherein the first VNS includes an Internet Protocol (IP) layer, wherein the plurality of VNSs are located in the single execution environment;
processing the first packet by the first VNS to obtain a first processed packet; and
sending the first processed packet from the first VNS to a physical network interface card (NIC) operatively connected to the first VNS; and
if the first VSQ has exceeded the first bandwidth allocation, then perform:
blocking the first application from issuing the first packet.

2. The method of claim 1, further comprising:
determining, based on a transport protocol associated with a second packet, a second VSQ of the plurality of VSQs with which the second packet is associated, wherein the first application is attempting to issue the second packet;
if the second VSQ has not exceeded a second bandwidth allocation, wherein the second VSQ is associated with the second packet and is associated with the second bandwidth allocation, then perform:
sending the second packet to the second VSQ;
processing the second packet by a second VNS of the plurality of VNSs to obtain a second processed packet, wherein the second VSQ is associated with the second VNS; and
sending the second processed packet to a physical NIC operatively connected to the second VNS; and
if the second VSQ has exceeded the second bandwidth allocation, then perform blocking the first application from issuing the second packet.

3. The method of claim 2, further comprising:
determining, based on a transport protocol associated with a third packet, a third VSQ of the plurality of VSQs with which the third packet is associated, wherein a second application is attempting to issue the third packet;
if the third VSQ has not exceeded a third bandwidth allocation, wherein the third VSQ is associated with the third packet and is associated with the third bandwidth allocation, then perform:
sending the third packet to the third VSQ;
processing the third packet by a third VNS of the plurality of VNSs to obtain a third processed packet, wherein the third VSQ is associated with the third VNS; and
sending the third processed packet to a physical NIC operatively connected to the third VNS; and
if the third VSQ has exceeded the third bandwidth allocation, then perform blocking the second application from issuing the third packet.

4. The method of claim 1, further comprising:
attempting to reissue the first packet by the first application after a first period of time has elapsed and the first application was previously blocked.

5. The method of claim 1, further comprising:
if the first application is blocked, then perform:
receiving a notification, by the first application, that the first application is no longer blocked; and
re-issuing the first packet by the first application after receiving the notification.

6. The method of claim 1, wherein the transport layer is configured to only process packets associated with a single transport protocol.

7. The method of claim 6, wherein the single transport protocol is one selected from a group consisting of Transmission Control Protocol (TCP) and User Datagram Protocol (UDP).

8. The method of claim 1, wherein determining the first VSQ with which the first packet is associated comprises:
determining whether the first packet is associated with a connection; and
determining with which of the plurality of VSQs the connection is associated with, if the first packet is associated with a connection.

9. The method of claim 8, further comprising:
if the first packet is not associated with the connection, then perform:
determining a socket associated with the first packet; and
determining with which of the plurality of VSQs the socket is associated.

10. The method of claim 9, wherein determining with which of the plurality of VSQs the socket is associated with comprising:
querying a mapping data structure to determine to which of the plurality of VSQs the socket is mapped.

11. A system, comprising:
a first application configured to attempt to issue a first packet;
a plurality of virtual serialization queues (VSQs);
a plurality of virtual network stacks (VNSs);
a physical network interface card (NIC),
a physical processor;
a non-volatile computer usable storage medium having computer readable program code embodied therein, the computer readable program code adapted to, when executed by the processor, implement a method comprising:
determining, based on a transport protocol associated with the first packet, a first virtual serialization queue (VSQ) of the plurality of VSQs with which the first packet is associated, after the first application has attempted issuing the first packet, wherein the plurality of VSQs are located in a single execution environment;
if the first VSQ has not exceeded a first bandwidth allocation associated with the first VSQ, then:
enabling the first application to issue the first packet to the first VSQ;
sending the first packet from the first application to the first VSQ;
queuing the first packet by the first VSQ;
sending the first packet from the first VSQ to a first virtual network stack (VNS) of a plurality of virtual network stacks (VNSs), wherein the first VNS is associated with the first VSQ, wherein the first VNS includes a transport layer corresponding to the transport protocol associated with the first packet, wherein the first VNS includes an Internet Protocol (IP) layer, wherein the plurality of VNSs are located in the single execution environment;
processing the first packet by the first VNS to obtain a first processed packet; and
sending the first processed packet from the first VNS to the NIC, wherein the physical NIC is operatively connected to the first VNS; and
if the first VSQ has exceeded the first bandwidth allocation, then blocking the first application from issuing the first packet.

12. The system of claim 11, further comprising:
a second VNS, wherein the first application is configured to attempt issuing a second packet,
wherein the method further comprises:
determining with which of the plurality of VSQs the second packet is associated, after the first application has attempted issuing the second packet;
if a second VSQ of the plurality of VSQs has not exceeded a second bandwidth allocation, wherein the second VSQ is associated with the second packet and is associated with the second bandwidth allocation, then:
enabling the first application to issue the second packet to the second VSQ;
processing the second packet by the second VNS to obtain a second processed packet, wherein the second VSQ is associated with the second VNS; and
sending the second processed packet to the NIC, wherein the physical NIC is operatively connected to the second VNS; and
if the second VSQ has exceeded the second bandwidth allocation, then blocking the first application from issuing the second packet.

13. The system of claim 12, wherein the first VSQ is associated with a first configuration parameter and the second VSQ is associated with a second configuration parameter, wherein the first configuration parameter specifies that any thread accessing the first VSQ implement a mutual exclusion policy and wherein the second configured parameter specifies that multiple threads may concurrently access the second VSQ.

14. The system of claim 12, further comprising:
a third VNS;
a second application, wherein the second application is configured to attempt issuing a third packet,
wherein the method further comprises:
determining with which of the plurality of VSQs the third packet is associated, after the second application has attempted to issue the third packet;
if a third VSQ of the plurality of VSQs has not exceeded a third bandwidth allocation, wherein the third VSQ is associated with the third packet and is associated with the third bandwidth allocation, then:
enabling the second application to issue the third packet to the third VSQ;
processing the third packet by the third VNS to obtain a third processed packet, wherein the third VSQ is associated with the third VNS; and
sending the third processed packet to the NIC, wherein the physical NIC is operatively connected to the third VNS; and
if the third VSQ has exceeded the third bandwidth allocation, then blocking the second application from issuing the third packet.

15. The system of claim 11, wherein the transport layer is configured to only process packets associated with a single transport protocol.

16. The system of claim 15, wherein the single transport protocol is one selected from the group consisting of Transmission Control Protocol (TCP) and User Datagram Protocol (UDP).

17. The system of claim 11, wherein determining the first VSQ with which the first packet is associated comprises:
- determining whether the first packet is associated with a connection; and
- determining with which of the plurality of VSQs the connection is associated, if the first packet is associated with a connection.

18. The system of claim 17, further comprising:
- if the first packet is not associated with the connection, then perform:
  - determining a socket associated with the first packet; and
  - determining with which of the plurality of VSQs the socket is associated with, wherein determining with which of the plurality of VSQs the socket is associated with comprises querying a mapping data structure to determine which of the plurality of VSQs is mapped to the socket.

19. The system of claim 11, wherein the system further comprises a plurality of virtual network interface cards (VNICs), and wherein sending the first processed packet from the first VNS to the NIC comprises:
- sending the first packet from the first VNS to a first VNIC of the plurality of VNICs; and
- sending the first packet from the first VNIC to the NIC.

20. A non-transitory computer readable medium comprising executable instructions for performing a method for sending packets, the method comprising:
- determining, based on a transport protocol associated with a first packet, a first virtual serialization queue (VSQ) of a plurality of virtual serialization queues (VSQs) with which the first packet is associated, wherein a first application is attempting to issue the first packet, wherein the plurality of VSQs are located in a single execution environment;
- if the first VSQ has not exceeded a first bandwidth allocation associated with the first VSQ, then perform:
  - sending the first packet from the first application to the first VSQ;
  - queuing the first packet by the first VSQ;
  - sending the first packet from the first VSQ to a first virtual network stack (VNS) of a plurality of virtual network stacks (VNSs), wherein the first VNS is associated with the first VSQ, wherein the first VNS includes a transport layer corresponding to the transport protocol associated with the first packet, wherein the first VNS includes an Internet Protocol (IP) layer, wherein the plurality of VNSs are located in the single execution environment;
  - processing the first packet by the first VNS to obtain a first processed packet; and
  - sending the first processed packet from the first VNS to a physical network interface card (NIC) operatively connected to the first VNS; and
- if the first VSQ has exceeded the first bandwidth allocation, then perform blocking the first application from issuing the first packet.

* * * * *